(12) United States Patent
Muratsu

(10) Patent No.: US 12,580,276 B2
(45) Date of Patent: Mar. 17, 2026

(54) ELECTRICAL STORAGE MODULE

(71) Applicant: Panasonic Intellectual Property Management Co., Ltd., Osaka (JP)

(72) Inventor: Jiro Muratsu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 861 days.

(21) Appl. No.: 17/633,612

(22) PCT Filed: Aug. 19, 2020

(86) PCT No.: PCT/JP2020/031346
§ 371 (c)(1),
(2) Date: Feb. 8, 2022

(87) PCT Pub. No.: WO2021/039550
PCT Pub. Date: Mar. 4, 2021

(65) Prior Publication Data
US 2022/0320689 A1 Oct. 6, 2022

(30) Foreign Application Priority Data
Aug. 30, 2019 (JP) ................................. 2019-158696

(51) Int. Cl.
*H01M 50/526* (2021.01)
*H01M 4/70* (2006.01)
*H01M 10/0585* (2010.01)

(52) U.S. Cl.
CPC ........... *H01M 50/526* (2021.01); *H01M 4/70* (2013.01); *H01M 10/0585* (2013.01)

(58) Field of Classification Search
CPC .. H01M 50/526; H01M 4/70; H01M 10/0585; H01M 50/213; H01M 50/503;
(Continued)

(56) References Cited

U.S. PATENT DOCUMENTS 10,153,475 B2 * 12/2018 Liu ...................... H01R 13/245
11,201,364 B2 * 12/2021 Kawakami ............ H01M 50/51
(Continued)

FOREIGN PATENT DOCUMENTS

| CN | 106469799 A | 3/2017 |
| DE | 102015215598 A1 | 2/2017 |

(Continued)

OTHER PUBLICATIONS

EPC Office Action dated Oct. 10, 2022 for the related European Patent Application No. 20856095.3.
(Continued)

*Primary Examiner* — Michael L Dignan
(74) *Attorney, Agent, or Firm* — Rimon P.C.

(57) ABSTRACT

An electrical storage module includes an insulating substrate that opposes an electrical storage group including a plurality of electrical storage devices and includes a plurality of through-holes, a plurality of current collecting foils that are arranged side by side at intervals from each other on a first surface of the insulating substrate on a side opposite to a surface that opposes the electrical storage group, and an insulating sheet that is disposed to cover the plurality of current collecting foils. The plurality of current collecting foils include a first current collecting foil and a second current collecting foil that are adjacent to each other at an interval in a direction parallel to the first surface. The first current collecting foil includes a first lead part in a tongue shape that extends from an edge, is inserted into a hole of the insulating substrate, and is electrically connected to a positive electrode of a battery, and the second current collecting foil includes a second lead part in a tongue shape that extends from the edge, is inserted into the hole of the insulating substrate, and is electrically connected to a negative electrode of the battery.

12 Claims, 10 Drawing Sheets

(58) Field of Classification Search
CPC ............. H01M 50/507; H01M 50/519; H01M 50/522; H01M 50/524; H01M 50/502; H01M 50/249; H01M 50/572; H01G 2/04; H01G 2/10; H01G 4/228; H01G 2/106; H01G 4/38; H01G 4/40; H01G 11/72; H01G 11/76; H01G 11/82; H01G 11/19
See application file for complete search history.

(56) References Cited

U.S. PATENT DOCUMENTS

| | | | |
|---|---|---|---|
| 2017/0048978 A1 | 2/2017 | Fees et al. | |
| 2017/0077487 A1* | 3/2017 | Coakley | H05K 1/118 |
| 2018/0190960 A1* | 7/2018 | Harris | H01M 50/20 |
| 2018/0212222 A1* | 7/2018 | Barton | H01M 50/3425 |
| 2019/0181400 A1 | 6/2019 | Nakasawa et al. | |

| | | | |
|---|---|---|---|
| 2019/0280267 A1* | 9/2019 | Bae | H01M 10/6556 |
| 2020/0176735 A1* | 6/2020 | Muratsu | H01M 50/55 |
| 2021/0126316 A1 | 4/2021 | Nakasawa et al. | |

FOREIGN PATENT DOCUMENTS

| | | | |
|---|---|---|---|
| WO | 2017/169728 | | 10/2017 |
| WO | 2018/003468 | | 1/2018 |
| WO | 2018/105905 | A1 | 6/2018 |
| WO | 2018/126136 | | 7/2018 |
| WO | 2019/058938 | | 3/2019 |

OTHER PUBLICATIONS

International Search Report of PCT application No. PCT/JP2020/031346 dated Nov. 2, 2020.
English Translation of Chinese Office Action dated Jul. 29, 2023 for the related Chinese Patent Application No. 202080042079.8.

* cited by examiner

ELECTRICAL STORAGE MODULE

CROSS-REFERENCE TO RELATED APPLICATIONS

This application is a U.S. national stage application of the PCT International Application No. PCT/JP2020/031346 filed on Aug. 19, 2020, which claims the benefit of foreign priority of Japanese patent application No. 2019-158696 filed on Aug. 30, 2019, the contents all of which are incorporated herein by reference.

TECHNICAL FIELD

The present disclosure relates to an electrical storage module.

BACKGROUND ART

Conventional electrical storage modules include the one described in PTL 1. This electrical storage module includes a plurality of cylindrical batteries, a positive-electrode current collecting plate, and a negative-electrode current collecting plate. The positive-electrode current collecting plate is used to connect the positive electrodes of the plurality of cylindrical batteries in parallel on one side in an axial direction of the cylindrical batteries, and the negative-electrode current collecting plate is used to connect the negative electrodes of the plurality of cylindrical batteries in parallel on the other side in the axial direction of the cylindrical batteries. In this electrical storage module, the positive-electrode current collecting plate and the negative-electrode current collecting plate are used to appropriately connect the plurality of cylindrical batteries in parallel and increase the battery capacity.

CITATION LIST

Patent Literature

PTL 1: WO 2018/003468

SUMMARY OF THE INVENTION

By disposing both the positive-electrode current collecting plate and the negative-electrode current collecting plate on one side (same side) in the height direction of an electrical storage device, it is possible to compactly configure the electrical storage module. However, when such a configuration is adopted, it becomes necessary to dispose, at an interval from each other, the positive-electrode current collecting plate and the negative-electrode current collecting plate that constitute the current collecting foil, and therefore the current collecting plates cannot be integrally formed, which deteriorates the handleability of the current collecting plates. An object of the present disclosure is to provide an electrical storage module that can be compactly configured and can also improve handleability of a current collecting plate.

An electrical storage module according to the present disclosure include: an electrical storage group that includes a plurality of electrical storage devices each including a first electrode and a second electrode; and a current collecting member in a plate shape that electrically connects the plurality of electrical storage devices to one another and faces the electrical storage group, in which the current collecting member includes an insulating substrate that opposes the electrical storage group and includes a plurality of holes, a plurality of current collecting foils that are arranged side by side on a first surface of the insulating substrate on a side opposite to a surface that faces the electrical storage group, and an insulating sheet that is provided on the plurality of current collecting foils, of the plurality of current collecting foils, a first current collecting foil and a second current collecting foil adjacent to each other in a direction parallel to the first surface are disposed apart from each other, the insulating substrate includes one or more holes that at least partially overlap between the first current collecting foil and the second current collecting foil when viewed in a height direction, the first current collecting foil includes a first lead part in a tongue shape that extends from an edge, is inserted into the hole of the insulating substrate, and is electrically connected to the first electrode of the electrical storage device, the second current collecting foil includes a second lead part in a tongue shape that extends from an edge, is inserted into the hole of the insulating substrate, and is electrically connected to the second electrode of the electrical storage device, and the insulating sheet extends to cover the first current collecting foil and the second current collecting foil.

According to the electrical storage module of the present disclosure, since the plurality of current collecting foils are arranged side by side on the first surface of the insulating substrate on a side opposite to a surface that faces the electrical storage group, the plurality of current collecting foils can be arranged only on one side in the height direction, and the electrical storage module can be compactly configured. Since the insulating sheet extends to cover the first current collecting foil and the second current collecting foil, both the first and second current collecting foils can be fixed to the insulating sheet, and the first and second current collecting foils can be handled integrally. Therefore, handleability of the current collecting foils can also be improved in preparing the current collecting member.

BRIEF DESCRIPTION OF THE DRAWINGS

FIG. 13 is a plan view showing an example of a layout of arrangement of batteries in an electrical storage group.

FIG. 14 is a plan view showing another example of the layout of arrangement of batteries in the electrical storage group.

DESCRIPTION OF EMBODIMENT

Figure 1:
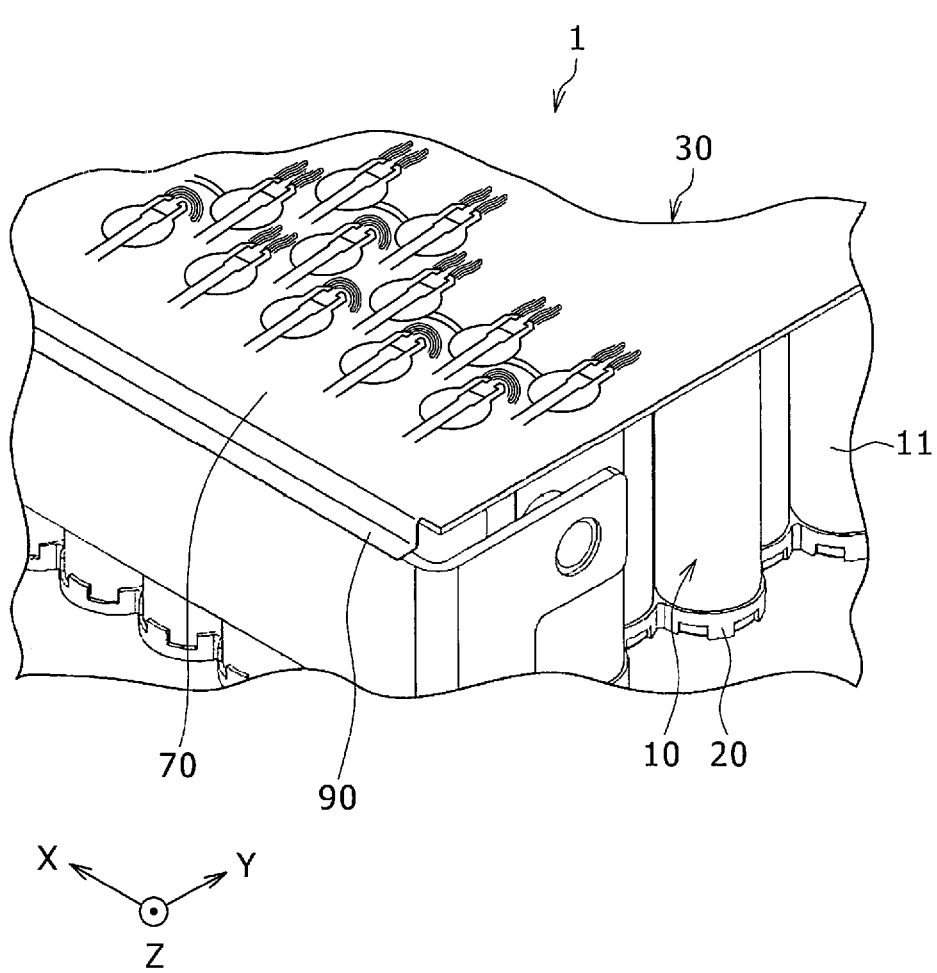
FIG. 1 is a partial perspective view of an electrical storage module according to one exemplary embodiment of the present disclosure.

Hereinafter, an exemplary embodiment according to the present disclosure is described in detail with reference to the accompanying drawings. Note that, in a case where a plurality of exemplary embodiments and modified examples are included in the following, it is assumed from the beginning to construct a new exemplary embodiment by appropriately combining feature parts of these. In the following example, the same configurations are given the same reference numerals in the drawings, and redundant descriptions are omitted. In addition, a plurality of drawings include schematic views, and dimensional ratios such as a length, a width, and a height of each member do not necessarily coincide among different drawings. In the following description and drawings, an X direction, which is a first direction, indicates an arrangement direction in which, regarding cylindrical batteries 11 arranged in a plurality of rows, two or more cylindrical batteries 11 belonging to each row are arranged. A Y direction indicates an orthogonal direction orthogonal to the arrangement direction, and a Z direction indicates a height direction of electrical storage module 1. The X, Y, and Z directions are orthogonal to one another. The electrical storage device may be a prismatic secondary battery or a capacitor, but in the present example, a case where the electrical storage device is a cylindrical secondary battery will be described as an example. In the present description, the term "substantially" is used in the same meaning as the term "roughly speaking", and the requirement "substantially . . . " is satisfied when a human sees it almost as . . . . For example, the requirement of a substantially circular shape is satisfied when a human sees it almost as a circular shape. Those configuration elements described in the following that are not recited in independent claims representing the highest concept are shown herein as optional configuration elements and are not essential.

FIG. 1 is a partial perspective view of electrical storage module 1 according to one exemplary embodiment of the present disclosure. As shown in FIG. 1, electrical storage module 1 includes electrical storage group 10, first holder 20, a second holder (not illustrated), and current collecting member 30. Electrical storage group 10 includes a plurality of cylindrical secondary batteries (hereinafter, simply referred to as battery) 11 as an example of a plurality of electrical storage devices. Battery 11 includes, for example, an electrode group in which a positive electrode and a negative electrode are wound via a separator, a cylindrical outer covering can in which this electrode group is contained together with an electrolyte solution, and a sealing body that seals an opening of this outer covering can in a state of being electrically insulated from the outer covering can. The outer covering can is electrically connected to the negative electrode of the electrode group, and the sealing body is electrically connected to the positive electrode. An insulating gasket is disposed between an outer peripheral surface of the sealing body and an inner peripheral surface of an opening end of the outer covering can. The opening end of the outer covering can is bent toward the inside of the outer covering can together with the gasket, and covers an outer peripheral edge of the sealing body.

First holder 20 is disposed to cover a bottom part of the outer covering can of battery 11. First holder 20 includes as many first containers opening toward battery 11 as batteries 11, and each of the first containers includes a concave shape corresponding to an end part of battery 11 on a side opposite to the positive electrode side. On the other hand, the second holder is disposed on the sealing plate side of battery 11. The second holder includes as many second containers as batteries 11, the second containers containing the sealing body of battery 11 and the opening of the outer covering can. Each of the second containers includes an inner peripheral surface facing the outer peripheral surface of the outer covering can, and a height-direction positioning portion extending from the inner peripheral surface toward the inside of the second container and coming into contact with a part of the peripheral edge part of the end surface on the sealing body side of battery 11. For example, the bottom part side of the outer covering can of each battery 11 is contained in the first container, and the sealing body side of each battery 11 is contained in the second container, whereby the plurality of batteries 11 in electrical storage group 10 are positioned. The number of the first and second containers may be greater than the number of the electrical storage devices.

Figure 2:
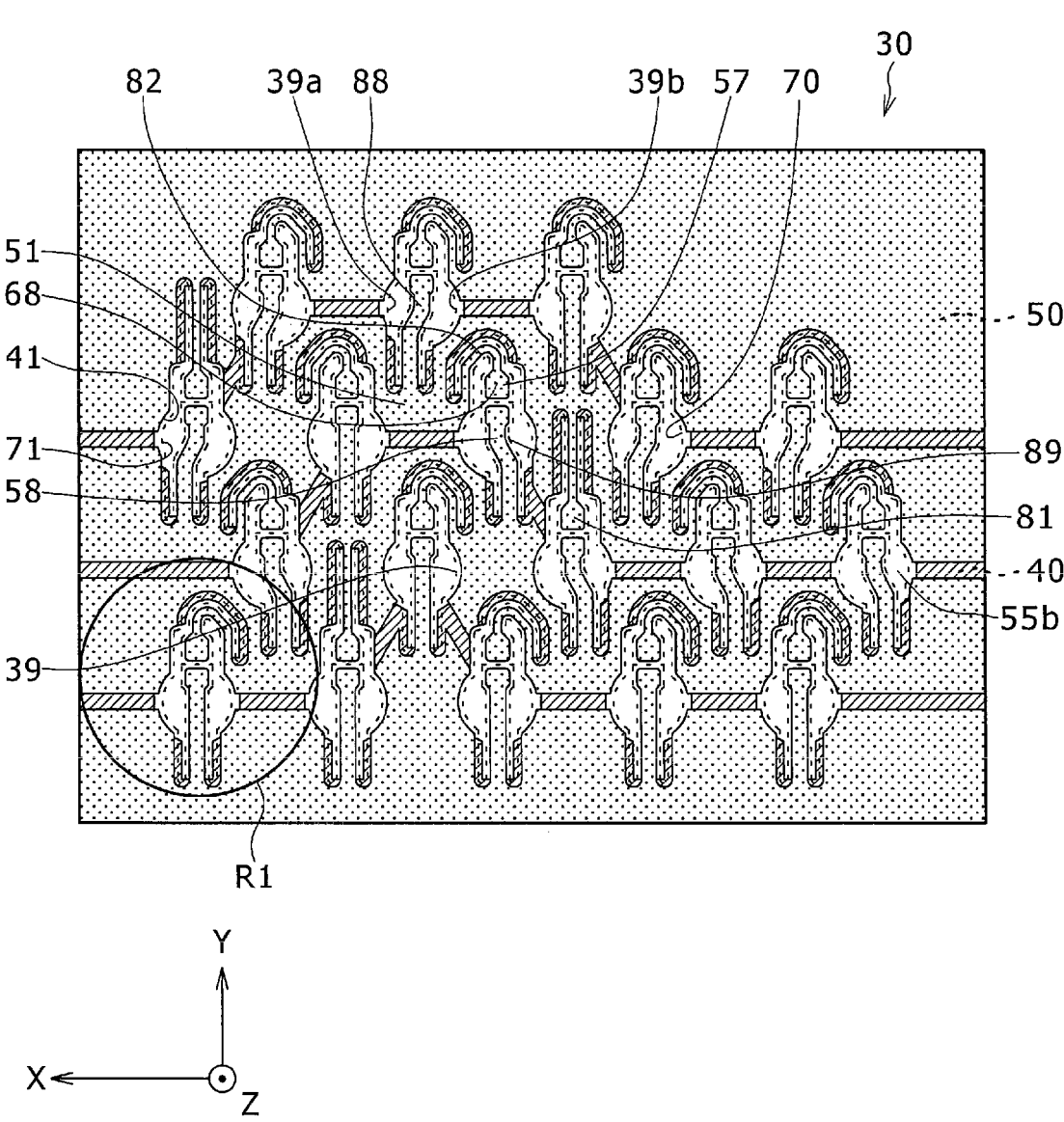
FIG. 2 is a plan view of a current collecting member of the electrical storage module.
Figure 3:
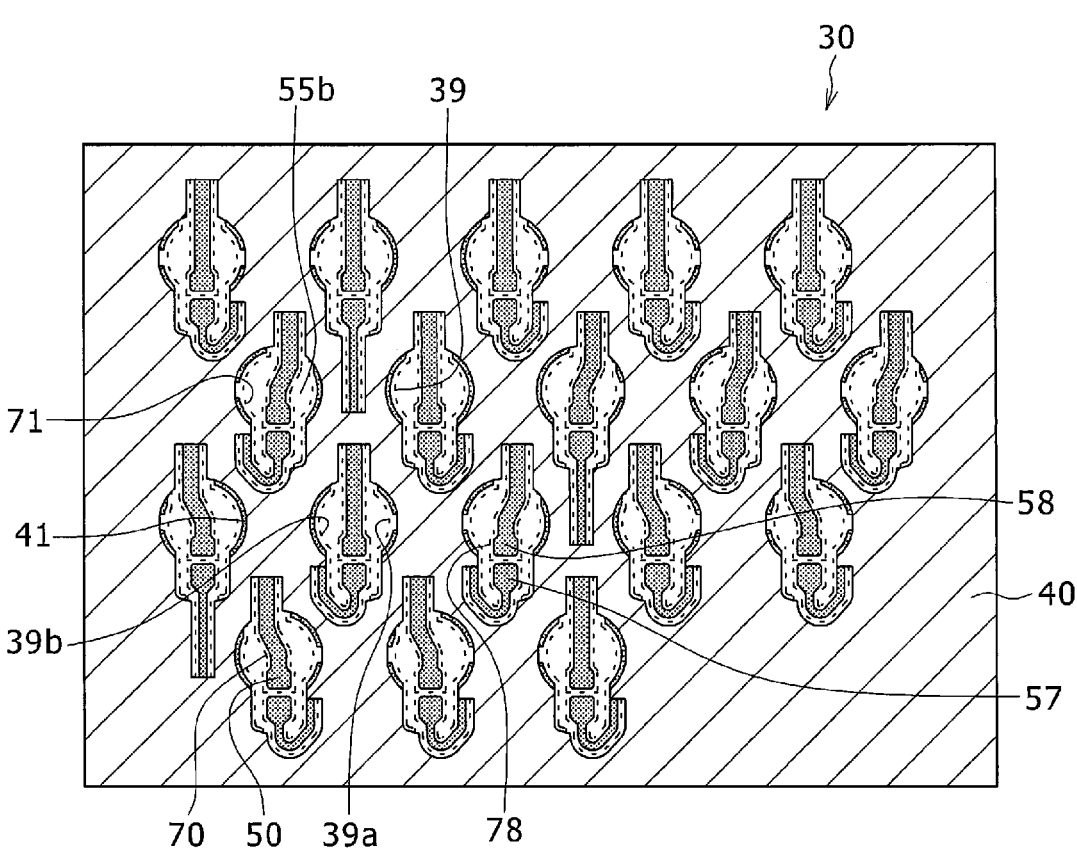
FIG. 3 is a bottom view of the current collecting member.
Figure 3:
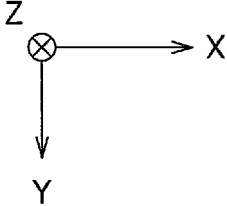

FIG. 2 is a plan view of current collecting member 30, and FIG. 3 is a bottom view of current collecting member 30 as viewed from the electrical storage group. In FIGS. 2 and 3, a dotted line represents an edge of insulating sheet 70, a dotted hatched region is a region where current collecting foil 50 exists, and a hatched region is a region where insulating substrate 40 exists. Current collecting member 30 includes a plate shape, and includes insulating substrate 40, a plurality of metal current collecting foils 50, and insulating sheet 70. Insulating substrate 40, current collecting foil 50, and insulating sheet 70 are disposed to be stacked, and current collecting member 30 includes a three-layer structure. The insulating substrate is made of an insulating material and includes a plate shape. The rigidity of the insulating substrate is higher than the rigidity of insulating sheet 70. Insulating substrate 40 opposes electrical storage group 10, and the three layers are arranged in order of the insulating substrate, the plurality of current collecting foils, and insulating sheet 70 from electrical storage group 10.

Insulating substrate 40 includes, for example, a glass composite substrate, a glass epoxy substrate, a Teflon (registered trademark) substrate, an alumina (ceramic) substrate, a polycarbonate (PC) substrate, an acrylic substrate, or a composite substrate. Insulating substrate 40 preferably has heat resistance equivalent to that of the glass epoxy substrate or heat resistance higher than that of the glass epoxy substrate.

The plurality of current collecting foils 50 include metal foils, for example, aluminum foils, copper foils, or the like. On insulating substrate 40, the plurality of current collecting foils 50 are arranged side by side on the first surface on a side opposite to the surface facing electrical storage group 10. Insulating sheet 70 may include any insulating sheet, and includes, for example, a polyethylene terephthalate (PET) film, a polycarbonate (PC) film, a polyimide film, or a fluorine film. Insulating sheet 70 has is higher in flexibility than insulating substrate 40. This configuration enables unwinding, winding, and the like to be performed when the plurality of current collecting foils 50 are obtained on insulating sheet 70, and therefore productivity is enhanced in preparing the current collecting members. Insulating sheet 70 includes an integral structure, is disposed on a side opposite to the insulating substrate side in the plurality of current collecting foils, and is disposed to cover a surface on a side opposite to electrical storage group 10 in the plurality of current collecting foils 50. All of the plurality of current collecting foils 50 are attached to insulating sheet 70 with an adhesive or the like. The structure in which the plurality of current collecting foils 50 and insulating sheet 70 are integrated can be formed, for example, by bonding an integrated sheet conductive foil to insulating sheet 70 and then etching this conductive foil into a predetermined shape.

The structure in which the plurality of current collecting foils 50 and insulating sheet 70 are integrated is attached and fixed to insulating substrate 40 on the side opposite to electrical storage group 10 with, for example, an adhesive or a double-sided tape, and as a result, insulating substrate 70, the plurality of current collecting foils 50, and insulating sheet 70 are integrated to form current collecting member 30. Furthermore, insulating substrate 40 is bonded and screwed to the second holder not illustrated. Due to this, current collecting member 30, electrical storage group 10, and the first and second holders are integrated into one to constitute a main part of the electrical storage module. The main part of the electrical storage module may be contained in a case not illustrated in a state of being positioned with respect to the case.

Figure 4:
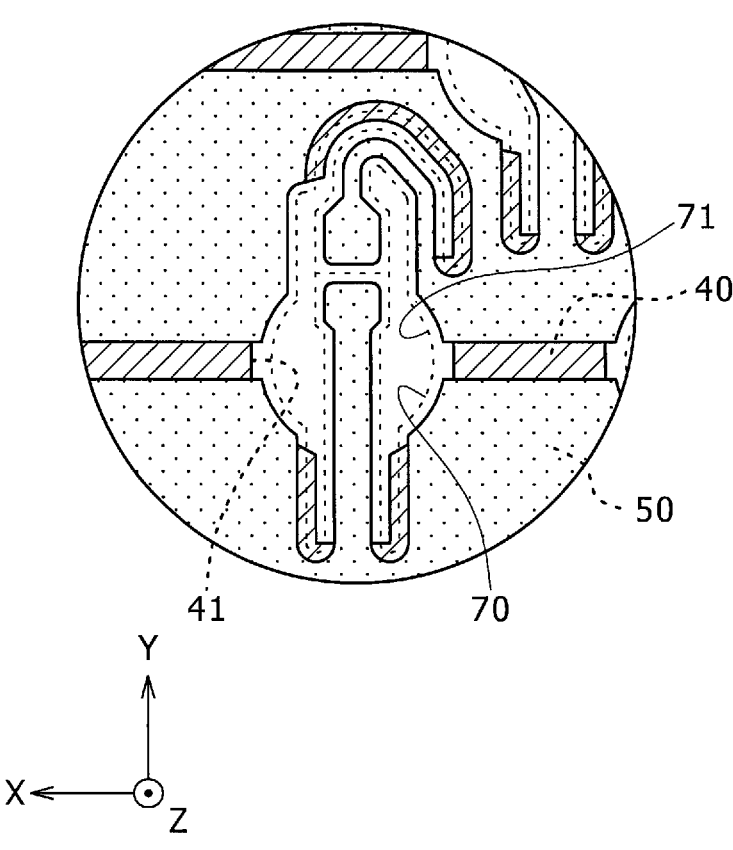
FIG. 4 is a plan view showing a partial excerpt of the current collecting member of FIG. 2.
Figure 5:
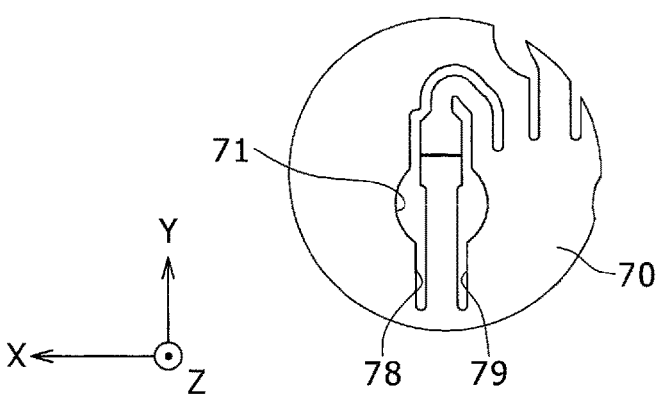
FIG. 5 is a plan view showing a partial excerpt of an insulating sheet part in a region indicated by R1 in FIG. 2 as viewed from a side opposite to a side facing a battery.
Figure 6:
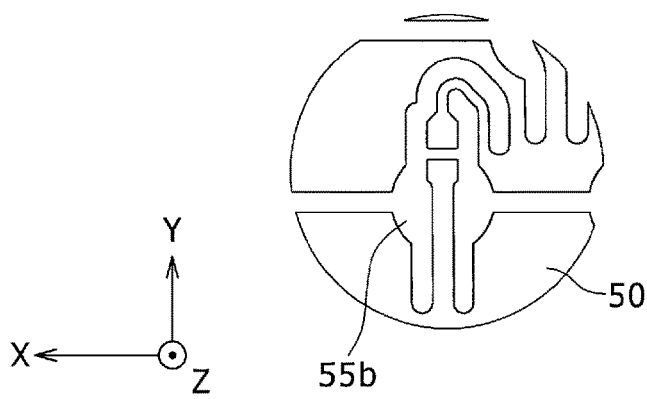
FIG. 6 is a plan view showing a partial excerpt of a current collecting foil in the region indicated by R1 in FIG. 2 as viewed from the side opposite to the side facing the battery.
Figure 7:
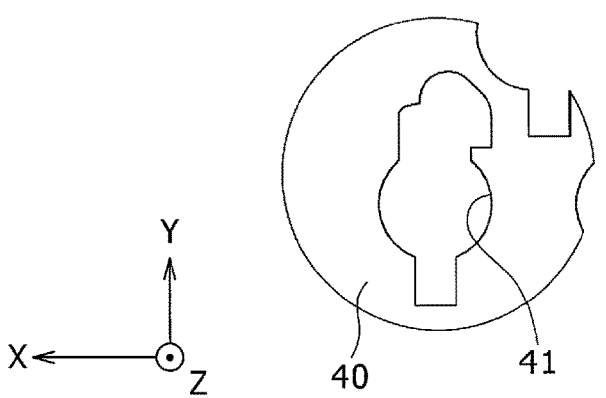
FIG. 7 is a plan view showing a partial excerpt of an insulating substrate part in the region indicated by R1 in FIG. 2 as viewed from the side opposite to the side facing the battery.
Figure 8:
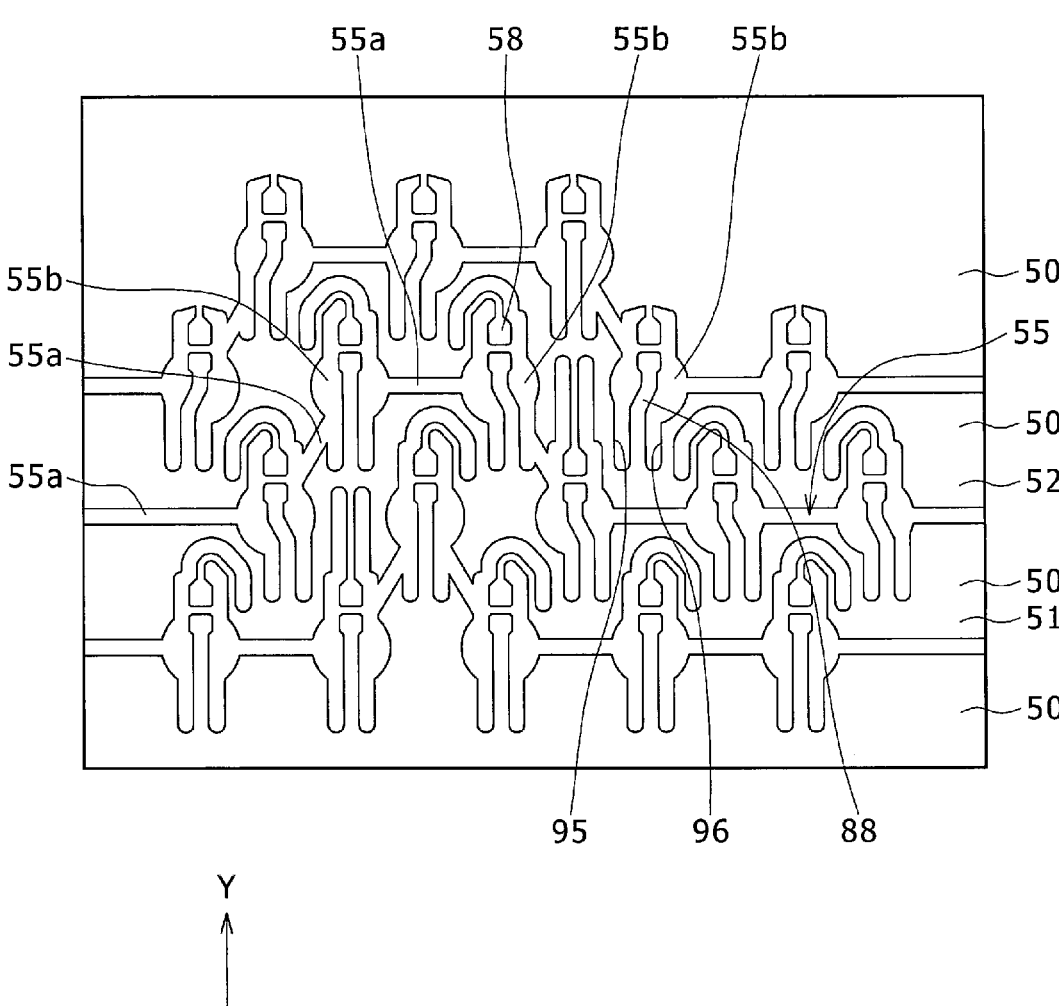
FIG. 8 is a plan view showing a structure of the current collecting foil of the current collecting member.

FIG. 4 is a plan view showing a partial excerpt of the current collecting member of FIG. 2. FIG. 5 is a plan view showing a partial excerpt of insulating sheet 70 in a region indicated by R1 in FIG. 2 as viewed from a side opposite to a side facing battery 11, and FIG. 6 is a plan view showing a partial excerpt of current collecting foil 50 in the region indicated by R1 in FIG. 2 as viewed from the side opposite to battery 11. FIG. 7 is a plan view showing a partial excerpt of insulating substrate 40 in the region indicated by R1 in FIG. 2 as viewed from the side opposite to battery 11. FIG. 8 is a plan view showing the structure of current collecting foil 50 in current collecting member 30.

As shown in FIG. 8, the plurality of current collecting foils 50 included in electrical storage module 1 are positioned at intervals in an orthogonal direction (Y direction) orthogonal to an arrangement direction (X direction) in which batteries 11 in each row are arranged in batteries 11 arranged in a plurality of rows. The plurality of current collecting foils 50 are arranged apart in the Y direction (included in the direction parallel to the first surface described above), and include first current collecting foil 51 and second current collecting foil 52 adjacent to each other in the Y direction.

Gap 55 provided between first current collecting foil 51 and second current collecting foil 52 includes a plurality of first regions 55*a* having elongated linear shapes and arranged at intervals, and a plurality of second regions 55*b* communicating with both of adjacent two first regions 55*a* and overlapping at least a part of an axial end surface (e.g., the top surface of the sealing body) of battery 11 regarding the height direction (Z direction). As described later, insulating substrate 40 includes one or more through-holes at least partially overlapping between first current collecting foil 51 and second current collecting foil 52 when viewed in the Z direction, and more specifically, at least a part of each through-hole of insulating substrate 40 overlaps second region 55*b* when viewed in the Z direction.

First current collecting foil 51 includes first lead part 57 in a tongue shape that extends from the edge, is inserted into the through-hole of insulating substrate 40, and is electrically connected to the positive electrode as the first electrode of battery 11. Second current collecting foil 52 includes second lead part 58 in a tongue shape that extends from the edge, is inserted into the through-hole of insulating substrate 40, and is electrically connected to the negative electrode as the second electrode of battery 11. A part of the edge of second region 55*b* is defined by the edge of first lead part 57 and the edge of second lead part 58. As shown in FIGS. 5 and 6, insulating sheet 70 includes through-hole 71 at least a part of which overlaps second region 55*b* when viewed in the Z direction, and as shown in FIGS. 6 and 7, insulating substrate 40 includes through-hole 41 at least a part of which overlaps second region 55*b* when viewed in the Z direction.

As shown in FIGS. 2 to 4, insulating sheet 70 includes lead protection part 89 in a tongue shape overlapping the entirety of first lead part 57 and the entirety of second lead part 58 when viewed in the Z direction. There is through-hole 39 of current collecting member 30 generated with all of through-hole 71, second region 55*b*, and through-hole 41 overlapping in the Z direction, and parts 39*a* and 39*b* of through-hole 39 exist on each of both sides in the X direction of lead protection part 89. In other words, first lead part 57, second lead part 58, and lead protection part 89 protrude to the inside of through-hole 39 of current collecting member 30. Insulating sheet 70 covers the entire surface of current collecting foil 50 on the side facing electrical storage group 10. This makes it possible to reliably insulate current collecting foil 50 from the outside.

Furthermore, when viewed in the height direction in a state where electrical storage group 10, first holder 20, the second holder (not illustrated), and current collecting member 30 are integrated into one, the positive electrode of battery 11 overlaps the tip end part of first lead part 57, and a part of the peripheral edge part in the outer covering can constituting the negative electrode of battery 11 overlaps the tip end part of second lead part 58.

On such a background, as shown in FIG. 3, through-hole 41 of insulating substrate 40 is larger than both through-hole 71 and second region 55*b* in a region other than the roots of first and second lead parts 57 and 58. Therefore, first and second lead parts 57 and 58 can be easily pushed down toward battery 11, and the end surface part of battery 11 exposed toward current collecting foil 50 via through-hole 41 can be widened. As a result, first lead part 57 can be reliably and easily welded to the positive electrode of battery 11, and second lead part 58 can be reliably and easily welded to the negative electrode of battery 11. As described above, the flexibility of insulating sheet 70 is higher than the flexibility of insulating substrate 40. Therefore, when first and second lead parts 57 and 58 are pushed down, insulating sheet 70 can be easily pushed down to follow first and second lead parts 57 and 58.

As shown in FIG. 2, the circuit part of electrical storage module 1 includes a circuit structure where three structures of five batteries 11 (see FIG. 1) connected in parallel are connected in series. The capacity of electrical storage module 1 is increased by connecting the plurality of batteries 11 in parallel as described above. Furthermore, the structures where the plurality of batteries 11 are connected in parallel are connected in series, thereby increasing the voltage of the electromotive force, i.e., electric power to be supplied.

Although not described in detail, electrical storage module 1 includes high-potential-side current collecting plate 90 (see FIG. 1) electrically connected to current collecting foil 50 where the potential becomes lowest and bonded to insulating substrate 40, and a low-potential-side current collecting plate (not illustrated) electrically connected to current collecting foil 50 where the potential becomes highest and bonded to insulating substrate 40. Electric power generated by electrical storage module 1 is extracted to the outside by using low-potential-side current collecting plate 90 and the high-potential-side current collecting plate.

As described above, according to electrical storage module 1 of the present disclosure, since the plurality of current collecting foils 50 are arranged side by side on the first surface of insulating substrate 40 on a side opposite to the surface facing electrical storage group 10, the plurality of current collecting foils 50 can be arranged only on one side in the Z direction, and electrical storage module 1 can be made compact and excellent in productivity. Since integral insulating sheet 70 extends to cover all current collecting foils 50 discretely arranged, all current collecting foils 50 can be fixed to integral insulating sheet 70, and all current collecting foils 50 can be handled integrally. In addition, since an insulating sheet holding a plurality of current collecting foils is obtained by processing a stack body of one insulating sheet 70 and one conductive foil, productivity is enhanced compared with a manufacturing method in which a plurality of current collecting foils are obtained from individual conductive foils and the plurality of these current collecting foils are attached to an insulating substrate. This can improve handleability of current collecting foil 50, and improves productivity of the current collecting member and eventually the electrical storage module. Furthermore, since the side of current collecting foil 50 opposite to electrical storage group 10 is covered with insulating sheet 70, current collecting foil 50 can be reliably insulated from the outside, and mechanical strength can also be secured. When the conductive foil on the insulating sheet is etched to obtain a plurality of current collecting foils, processing of holes and the like to the insulating sheet may be performed after obtaining the plurality of current collecting foils.

With reference to FIG. 2 again, the plurality of second lead parts 58 include one or more linear lead parts 81 extending linearly and one or more bent lead parts 82 bent in a substantially U shape in plan view as viewed in the height direction. A part of the edge of second region 55b is defined by the edge of bent lead part 82. The root side of bent lead part 82 extends in the X direction.

First lead part 57 electrically connected and closest to bent lead part 82 is inclined lead part 88 including inclined part 88a inclined to one side in the X direction so as to be apart from bent lead part 82 toward the root side of bent lead part 82 in the Y direction. As shown in FIG. 8, first current collecting foil 51 including inclined lead part 88 includes a pair of bottomed slits 95 and 96 on the root side of inclined lead part 88 and on both sides in the X direction. Next, this configuration will be described.

Figure 9:
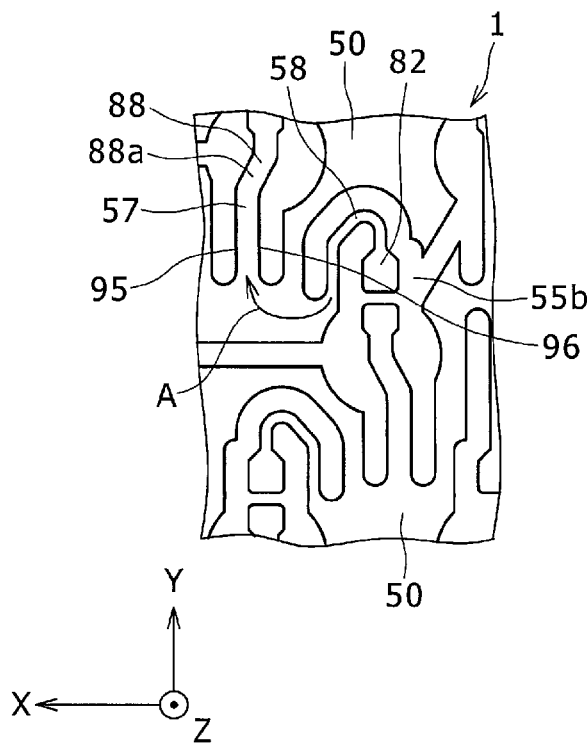
FIG. 9 is a plan view showing a part of adjacent current collecting foils of the electrical storage module.

FIG. 9 is a plan view showing a part of adjacent current collecting foils 50 of electrical storage module 1. The lead parts play a role of a fuse that causes cutting when over-current flows, and thus a predetermined length is required to ensure cutting when overcurrent flows. Here, as shown in FIG. 9, second lead part 58 is bent lead part 82 that is bent in a substantially U shape in plan view when viewed in the height direction. Bent lead part 82 makes it possible to shorten a current collecting path from the root of bent lead part 82 to the root of first lead part 57 connected in series to bent lead part 82 as in a path indicated by arrow A in FIG. 9 in comparison with a case where the second lead part extends linearly. Therefore, it is possible to reduce the current collecting resistance between the root of bent lead part 82 and first lead part 57 connected in series to bent lead part 82, and it is possible to enhance the energy efficiency of electrical storage module 1.

Electrical storage module 1 is sometimes used for applications in electric power supply in electric bicycles and electric vehicles, and is sometimes used in an environment where vibration is likely to occur. In this case, the root of first lead part 57 becomes easily damaged by vibration.

Slits 95 and 96 are formed on the root side of first lead part 57 in order to suppress damage of first lead part 57 on such a background. First lead part 57 is disposed between slits 95 and 96. Slits 95 and 96 extend the distance of first lead part 57. Therefore, first lead part 57 easily follows in the height direction by vibration, so that the stress acting on the root of first lead part 57 is relaxed, and first lead part 57 is less likely to be damaged by vibration.

Figure 10:
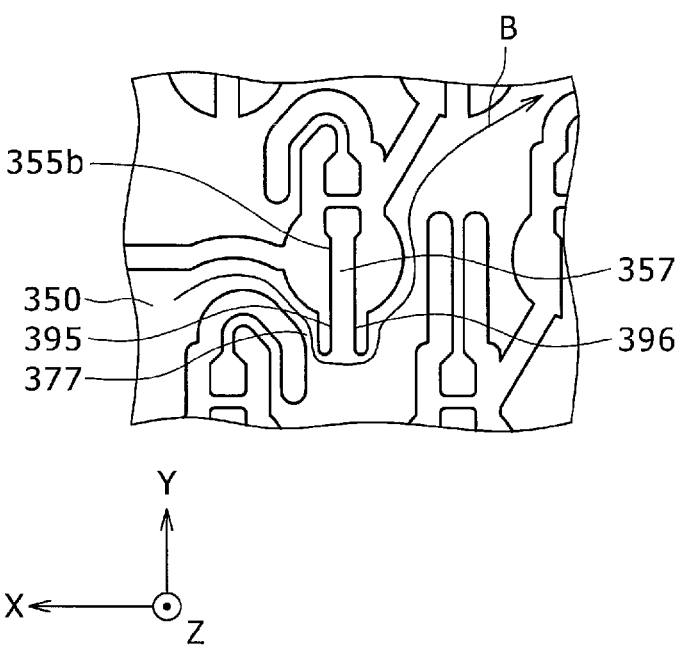
FIG. 10 is a plan view corresponding to FIG. 9 in an electrical storage module of a modified example.

FIG. 10 is a plan view showing a partial excerpt of the current collecting foil of current collecting member 30 in which slits 95 and 96 adjacent to first lead part 57 are extended in the Y direction. When a pair of bottomed slits 395 and 396 disposed on the root side of first lead part 357 extending linearly in the Y direction and on both sides in the X direction as in FIG. 10 and extending in the Y direction are formed, the width of local part 377 between second regions 355b adjacent in current collecting foil 350 decreases, current collecting foil 350 becomes easily cut at local part 377, and a possibility that the parallel connection indicated by arrow B in FIG. 10 is cut occurs.

On the other hand, in electrical storage module 1 of the present disclosure, first lead part 57 electrically connected to and closest to bent lead part 82 is inclined lead part 88 including inclined part 88a inclined to one side in the X direction toward the root side of bent lead part 82 in the Y direction. Therefore, even when second region 55b expands to one side in the X direction by forming bent lead part 82, the root of inclined lead part 88 can be disposed apart from second region 55b, and current collecting foil 50 can be suppressed or prevented from being cut. Therefore, according to electrical storage module 1 in which a part of current collecting foil 50 is shown in FIG. 9, in comparison with the electrical storage module of the modified example in which a part of current collecting foil 350 is shown in FIG. 10, it is possible to achieve remarkable actions and effects of not only being able to suppress generation of Joule heat and being able to increase energy efficiency of electrical storage module 1 but also being able to suppress or prevent damage of first lead part 57 and damage of current collecting foil 50.

Note that the present disclosure is not limited to the above-described exemplary embodiment and the modified examples thereof, and various improvements and changes are possible within the matters described in the claims of the present application and the equivalent scope thereof.

Figure 11:
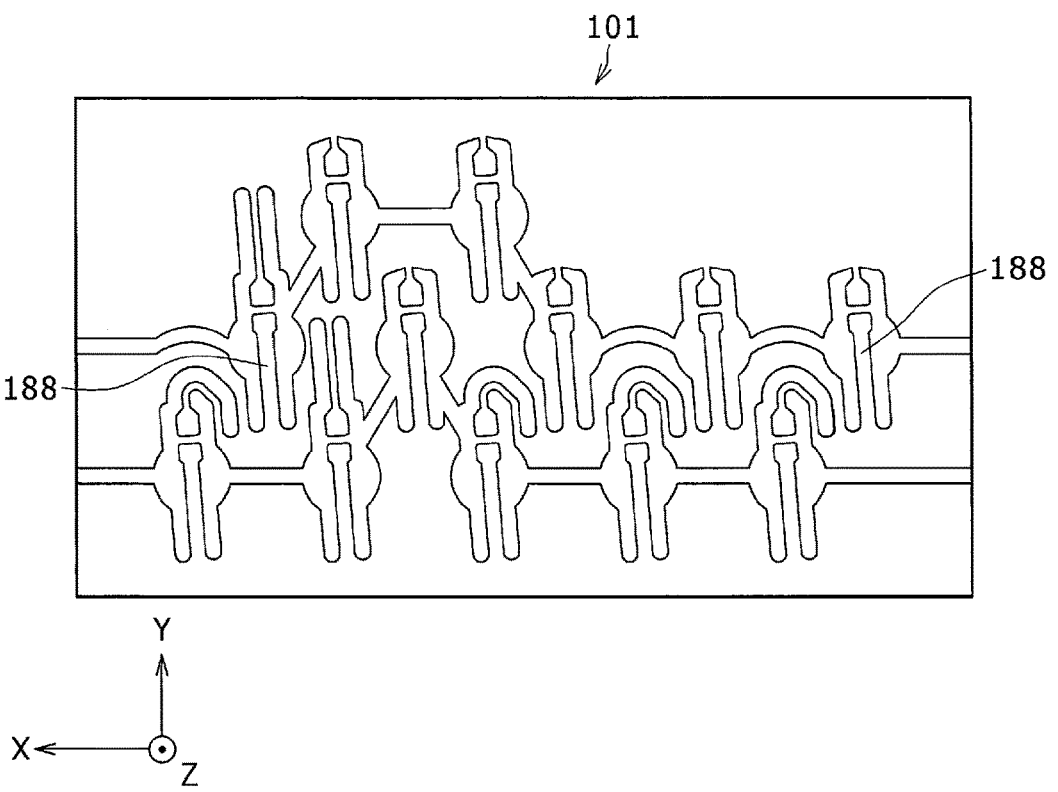
FIG. 11 is a plan view of a current collecting foil in a current collecting member used in an electrical storage module of another modified example.
Figure 12:
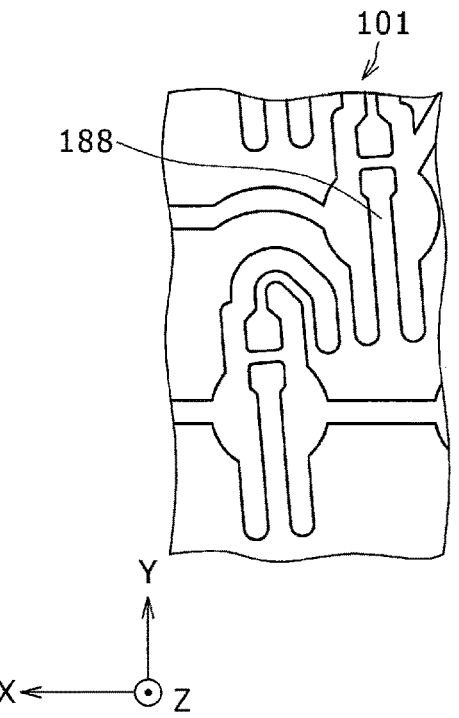
FIG. 12 is a plan view corresponding to FIG. 9 in an electrical storage module of another modified example.

For example, as shown in FIG. 9, the case where first lead part 57 is inclined lead part 88 including inclined part 88a has been described. However, first lead part 57 is not limited to this configuration. As shown in FIG. 11, i.e., a plan view corresponding to FIG. 8 in electrical storage module 101 of the modified example, and FIG. 12, i.e., a plan view corresponding to FIG. 9 in electrical storage module 101, all parts of inclined lead part 188 may be inclined to one side in the X direction toward the root side of the bent lead part in the Y direction.

Figure 13:
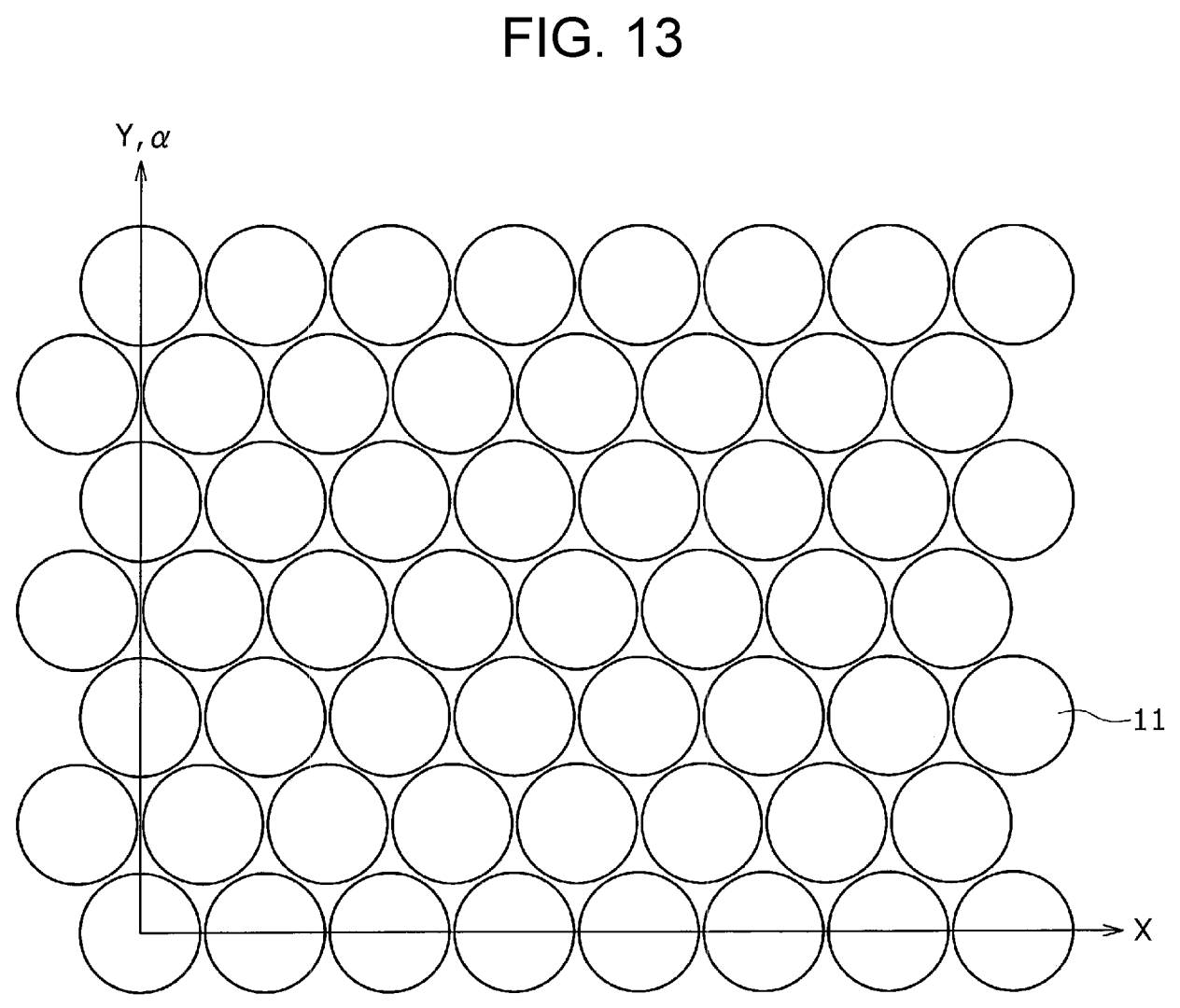
Figure 14:
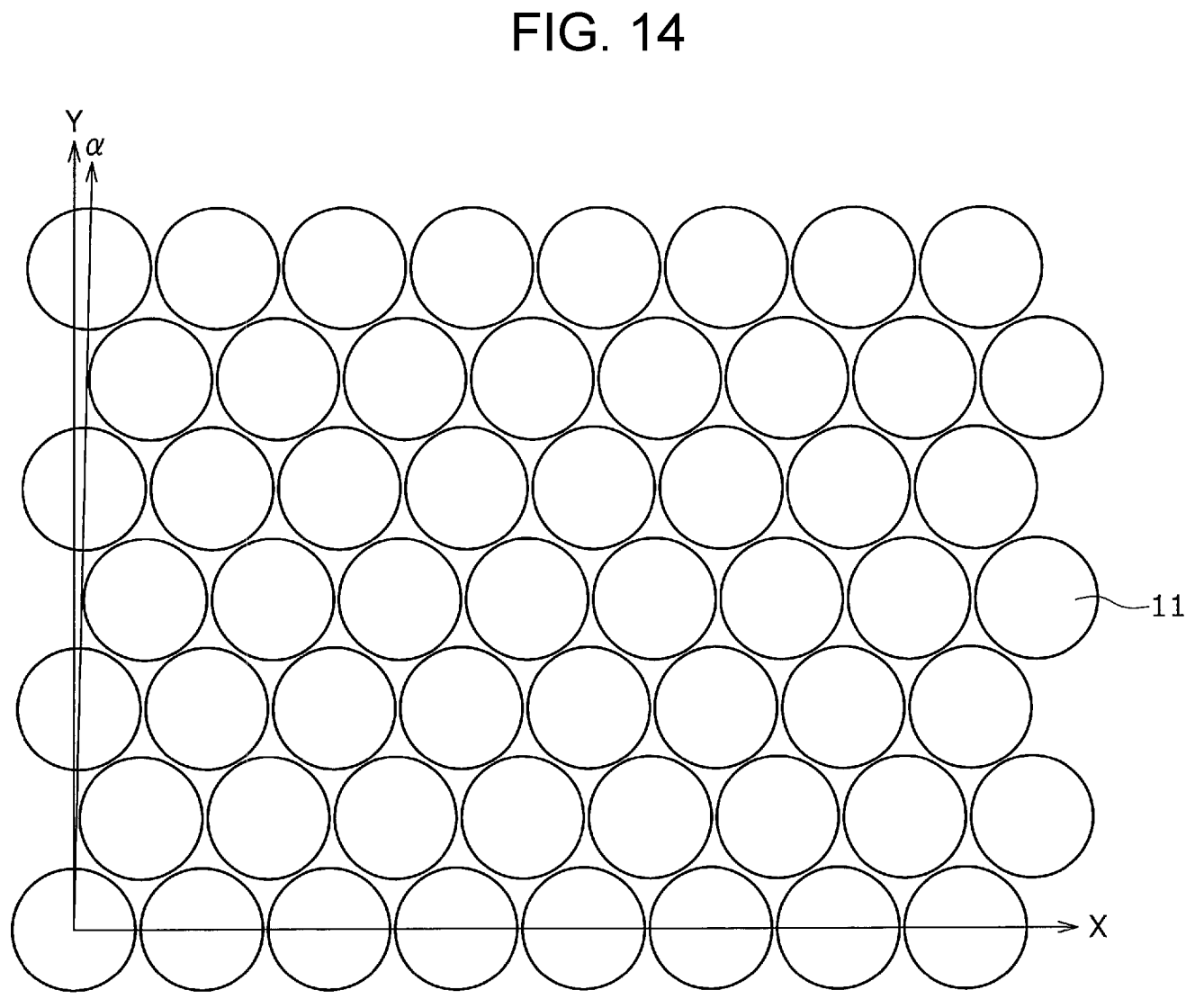

The arrangement of batteries 11 in electrical storage group 10 may also have a layout in which two or more batteries 11 are arranged at intervals not only in the arrangement direction (X direction) but also in the orthogonal direction (Y direction) as in the plan view shown in FIG. 13. Alternatively, as in the plan view shown in FIG. 14, the arrangement of batteries 11 in electrical storage group 10 may also have a layout in which two or more batteries 11 are arranged at intervals in a direction inclined at an acute angle with respect to the orthogonal direction (Y direction) orthogonal to the arrangement direction (X direction).

Furthermore, it is assumed that in the layout in the plan view of the plurality of batteries 11 in electrical storage group 10, a direction connecting the centers of batteries opposing each other in the substantially Y direction in every other row is defined as the current collecting direction. At this time, in the layout shown in FIG. 13, the current collecting direction indicated by an a direction coincides with the Y direction. On the other hand, in the layout shown in FIG. 14, the current collecting direction indicated by the a direction is inclined at an acute angle with respect to the Y direction. When the current collecting direction is defined in this manner, the inclined lead part may include an inclined part inclined so as to separate from the root of the bent lead part in the vicinity of this inclined lead part in the arrangement direction (X direction) with respect to the current collecting direction (a direction). By inclining the inclined lead part in this manner, it is possible to suppress a decrease in the width of the current collecting path between the bent lead part in the vicinity and this inclined lead part.

The case where slits 95 and 96 are provided on both sides of the root of the first lead part electrically connected to and closest to bent lead part 82 in current collecting foil 50 has been described. However, the configuration needs not to be adopted as presented below.

In the present example, as shown in FIG. 5, insulating sheet 70 includes through-hole 71 including the pair of bottomed slits 78 and 79 overlapping the pair of bottomed slits 95 and 96 of current collecting foil 50 as viewed in the Z direction, and when first and second lead parts 57 and 58 are pushed down when welded to the electrode of battery 11, they are easily pushed down following the pushing down. However, in the case of the present modified example, the insulating sheet needs not to include such a slit. According to the present modified example, all the first lead parts may extend linearly without including the inclined part.

REFERENCE MARKS IN THE DRAWINGS 1, 101: electrical storage module
10: electrical storage group
11: battery
20: first holder
30: current collecting member
39, 41, 71: through-hole
40: insulating substrate
50, 250: current collecting foil
51: first current collecting foil
52: second current collecting foil
55: gap provided between first current collecting foil and second current collecting foil
55a: first region
55b: second region
57, 257: first lead part
58: second lead part
68: part of bent lead part that is electrically connected to negative electrode
70: insulating sheet
78, 79: slit
81: linear lead part
82, 282: bent lead part
88, 188: inclined lead part
88a: inclined part
89: lead protection part
90: high-potential-side current collecting plate
95, 96: slit

The invention claimed is:

1. An electrical storage module comprising:
an electrical storage group that includes a plurality of electrical storage devices each including a first electrode and a second electrode; and
a current collecting member in a plate shape that electrically connects the plurality of electrical storage devices to one another and faces the electrical storage group, wherein:
the current collecting member includes
an insulating substrate that opposes the electrical storage group,
a plurality of current collecting foils that are arranged side by side on a first surface of the insulating substrate opposite to a second surface that faces the electrical storage group, and
an insulating sheet that is provided on the plurality of current collecting foils,
the electrical storage group, the insulating substrate, the plurality of current collecting foils, and the insulating sheet are disposed in an order of the electrical storage group, the insulating substrate, the plurality of current collecting foils, and the insulating sheet,
the plurality of current collecting foils includes a first current collecting foil and a second current collecting foil adjacent to each other in a direction parallel to the first surface, the first current collecting foil and the second current collecting foil being disposed apart from each other by a gap,
the insulating substrate includes one or more holes that at least partially overlap the gap between the first current collecting foil and the second current collecting foil when viewed in a height direction,
the first current collecting foil includes one or more first lead parts in a tongue shape that extends from an edge, wherein each of the one or more first lead parts is inserted into a corresponding one of the one or more holes of the insulating substrate and is electrically connected to the first electrode of each of the electrical storage devices,
the second current collecting foil includes one or more second lead parts in a tongue shape that extends from an edge, wherein each of the one or more second lead parts is inserted into a corresponding one of the one or more holes of the insulating substrate and is electrically connected to the second electrode of each of the electrical storage devices,
the insulating sheet extends to cover the first current collecting foil and the second current collecting foil,
the insulating sheet is higher in flexibility than the insulating substrate, and
the insulating sheet includes a lead protection part that defines a part of an edge of a hole included in the insulating sheet and that overlaps an entirety of one of the one or more first lead parts and an entirety of one of the one or more second lead parts when viewed in the height direction.

2. The electrical storage module according to claim 1, wherein the plurality of electrical storage devices are arrayed along the first surface, and the first electrode and the second electrode are provided close to the current collecting member in a direction where the electrical storage group and the current collecting member oppose each other.

3. The electrical storage module according to claim 1, wherein at least a part of the hole overlaps one of the one or more holes of the insulating substrate.

4. The electrical storage module according to claim 3, wherein the hole of the insulating sheet comprises a plurality of holes, each of the plurality of holes is a through-hole, and one of the plurality of holes of the insulating sheet is at least partially overlapped with a corresponding one of the one or more holes of the insulating substrate.

5. The electrical storage module according to claim 4, wherein each of the one or more holes of the insulating substrate is larger than each of the plurality of holes of the insulating sheet.

6. The electrical storage module according to claim 1, wherein a plurality of electrical storage devices are arranged in a plurality of rows, the first current collecting foil and the second current collecting foil are disposed at an interval in an orthogonal direction orthogonal to an arrangement direction where two or more of the electrical storage devices are arranged side by side in each of the plurality of rows, the gap provided between the first current collecting foil and the second current collecting foil includes a plurality of first regions in elongated linear shapes and arranged at intervals, and a plurality of second regions, each of the plurality of second regions being disposed between adjacent two of the plurality of first regions, communicating with both of the adjacent two of the plurality of first regions, and overlapping at least a part of an axial end surface of each of the electrical storage devices regarding the height direction, a part of an edge of each of the plurality of second regions is defined by an edge of each of the one or more first lead parts and an edge of each of the one or more second lead parts, a plurality of the second lead parts are provided and include one or more bent lead parts bent in a substantially U shape in plan view when viewed in the height direction, a root side of each of the one or more bent lead parts extends in a first direction, and each of the one or more first lead parts electrically connected to and closest to the one or more bent lead parts is an inclined lead part including an inclined part inclined to be apart from each of the plurality of second lead parts in the first direction toward the root side.

7. The electrical storage module according to claim 6, wherein the first current collecting foil including the inclined lead part includes a pair of bottomed slits on the root side of the inclined lead part and on both sides in the arrangement direction.

8. The electrical storage module according to claim 7, wherein the hole includes a pair of bottomed slits overlapping the pair of bottomed slits of the first current collecting foil when viewed in the height direction.

9. The electrical storage module according to claim 6, wherein all parts of the inclined lead part are inclined in the first direction toward the root side.

10. The electrical storage module according to claim 1, wherein the insulating substrate, the plurality of current collecting foils, and the insulating sheet are integrated by an adhesive to form the current collecting member.

11. The electrical storage module according to claim 1, wherein the insulating sheet covers an entire surface of the plurality of current collecting foils on a side facing the electrical storage group.

12. The electrical storage module according to claim 1, wherein the current collecting member is a three-layer structure, in which the plurality of current collecting foils are disposed between the insulating substrate and the insulating sheet.

* * * * *